(12) United States Patent
Yamazaki et al.

(10) Patent No.: US 8,896,740 B2
(45) Date of Patent: Nov. 25, 2014

(54) PROJECTION DEVICE, PROJECTION METHOD, AND PROGRAM

(75) Inventors: Tatsuya Yamazaki, Tokyo (JP); Katsumi Ikuta, Tokyo (JP); Atsuko Kashiwagi, Kanagawa (JP); Nobutaka Saitoh, Kanagawa (JP); Nobuhito Ebine, Tokyo (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 13/269,751

(22) Filed: Oct. 10, 2011

(65) Prior Publication Data

US 2012/0105701 A1    May 3, 2012

(30) Foreign Application Priority Data

Oct. 29, 2010 (JP) ............................... P2010-244426

(51) Int. Cl.
*H04N 5/222* (2006.01)
*H04N 5/225* (2006.01)
*H04N 9/31* (2006.01)

(52) U.S. Cl.
CPC ........... *H04N 5/2251* (2013.01); *H04N 9/3176* (2013.01)
USPC ................................. 348/333.1; 348/333.06

(58) Field of Classification Search
CPC .................................................... H04N 9/3176
USPC .......................................... 348/333.06, 333.1
See application file for complete search history.

(56) References Cited

U.S. PATENT DOCUMENTS

| | | | |
|---|---|---|---|
| 7,375,755 B2* | 5/2008 | Oya et al. | 348/333.02 |
| 7,500,758 B1* | 3/2009 | Adachi et al. | 353/101 |
| 2007/0223820 A1* | 9/2007 | Doi | 382/218 |
| 2008/0049192 A1* | 2/2008 | Nozaki et al. | 353/25 |
| 2009/0033785 A1* | 2/2009 | Fujinawa et al. | 348/333.01 |
| 2009/0231445 A1* | 9/2009 | Kanehiro | 348/208.2 |
| 2010/0295983 A1* | 11/2010 | Nozawa | 348/333.01 |
| 2011/0070920 A1* | 3/2011 | Saied | 455/552.1 |
| 2011/0085060 A1* | 4/2011 | Liu | 348/239 |
| 2011/0273551 A1* | 11/2011 | Yang et al. | 348/77 |

FOREIGN PATENT DOCUMENTS

| | | |
|---|---|---|
| JP | 2006-78752 | 3/2006 |
| JP | 2006-80875 | 3/2006 |
| JP | 2007-219225 | 8/2007 |
| JP | 2007-274338 | 10/2007 |
| JP | 2008-252673 | 10/2008 |
| JP | 2008-287142 | 11/2008 |
| JP | 2009-94686 | 4/2009 |
| JP | 2010-197755 | 9/2010 |
| JP | 2010-252285 | 11/2010 |

OTHER PUBLICATIONS

U.S. Appl. No. 13/235,826, Sep. 19, 2011, Yamazaki, et al.
U.S. Appl. No. 13/247,561, Sep. 28, 2011, Yamazaki, et al.
Office Action issued Feb. 12, 2014 in Japanese Application No. 2010-244426.

* cited by examiner

*Primary Examiner* — Nhan T Tran
*Assistant Examiner* — Chan Nguyen
(74) *Attorney, Agent, or Firm* — Oblon, Spivak, McClelland, Maier & Neustadt, L.L.P.

(57) ABSTRACT

An information processing apparatus including a main body, a member including a projection device, the member moveably attached to the main body, a detector that detects an orientation of the moveable member with respect to the main body, and a processor that controls the projection device based on an output of the detector.

16 Claims, 10 Drawing Sheets

PROJECTION DEVICE, PROJECTION METHOD, AND PROGRAM

CROSS REFERENCE TO RELATED APPLICATIONS

This application claims the benefit of priority under 35 U.S.C. §119 to Japanese Patent Application JP 2010-244426 filed in the Japan Patent Office on Oct. 29, 2010, the entire content of which is hereby incorporated by reference.

BACKGROUND

The present disclosure relates to a projection device, a projection method, and a program.

Devices having projection units for projecting images (projectors) have been known so far (see JP 2007-219225A). Further, recently, imaging devices mounted with small projectors have been proposed. According to such imaging device, content acquired through imaging can be projected from the projector. Thus, the content can be viewed by a large number of users without using a display device.

SUMMARY

However, the aforementioned imaging device has a problem in that, as a button or menu should be operated by the time projection from the projector is started, the operation for starting the projection is complex.

In light of the foregoing, it is desirable to provide an imaging device, a method for controlling the imaging device, and a program, which are novel and improved, and which can reduce the complexity of the operation for starting projection from a projection unit.

According to an exemplary embodiment, the disclosure is directed to an information processing apparatus including a main body, a member including a projection device, the member moveably attached to the main body, a detector that detects an orientation of the moveable member with respect to the main body, and a processor that controls the projection device based on an output of the detector.

According to another exemplary embodiment, the disclosure is directed to an information processing method performed by an information processing apparatus, the method including detecting, by a detector of the information processing apparatus, an orientation of a movable member movably attached to the main body of the information processing apparatus with respect to the main body, and controlling, by a processor of the information processing apparatus, a projection device included on the movable member based on an output of the first detector.

According to another exemplary embodiment, the disclosure is directed to a non-transitory computer-readable medium including computer-program instructions, which when executed by an information processing apparatus, cause the information processing apparatus to perform a method that includes detecting an orientation of a member moveably attached to a main body of the information processing apparatus, the member including a projection device, and controlling the projection device based on an output of the first detector.

According to the embodiments of the present disclosure described above, it is possible to reduce the complexity of the operation for starting projection from a projection unit.

DETAILED DESCRIPTION OF THE EMBODIMENTS

Figure 1:
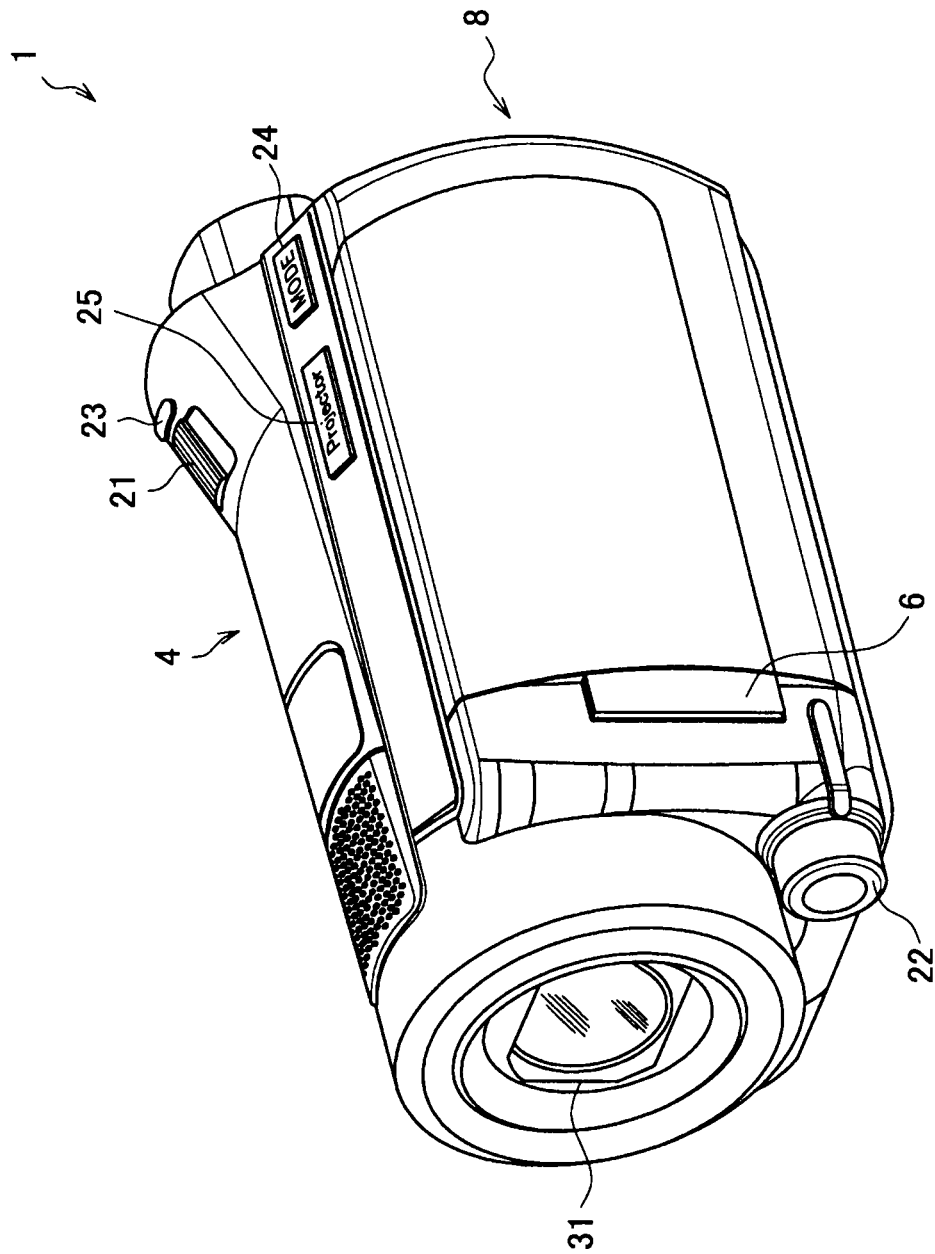
FIG. 1 is a perspective view showing the appearance of an imaging device in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The "DETAILED DESCRIPTION OF THE EMBODIMENTS" will be described in accordance with the following order.

1. Basic Configuration of Imaging Device in accordance with Embodiment of the Present Disclosure
2. First Embodiment
2-1. Configuration of Imaging Device
2-2. Operation of Imaging Device
3. Second Embodiment
4. Conclusion <1. Basic Configuration of Imaging Device in Accordance with Embodiment of the Present Disclosure>

The present disclosure can be implemented in various configurations as exemplarily described in detail in "2. First Embodiment" to "3. Second Embodiment." In addition, an imaging device (1) described in each embodiment includes:

A: a main body unit 4;
B: an open/close unit 8 connected to the main body unit 4 in an openable/closable manner;
C: a projection unit (a projector module 18) provided on the open/close unit 8; and
D: a control unit (a main control unit 100) that controls the start of projection in accordance with the direction that the main body unit 4 faces and the projection direction of the projection unit.

In this specification, an imaging device is referred to as an example of a projection device. In addition, although the imaging device 1 (video camera) is shown as an example of an imaging device in each embodiment of the present disclosure, the imaging device is not limited thereto. For example, the imaging device can be an information processing device such as a PC (Personal Computer), a PDA (Personal Digital Assistant), a home game machine, a portable phone, a PHS (Personal Handyphone System), a portable music playback device, a portable image processing device, or a portable game machine.

Hereinafter, a basic configuration that is common to each embodiment will be described with reference to FIGS. 1 to 6.

Figure 2:
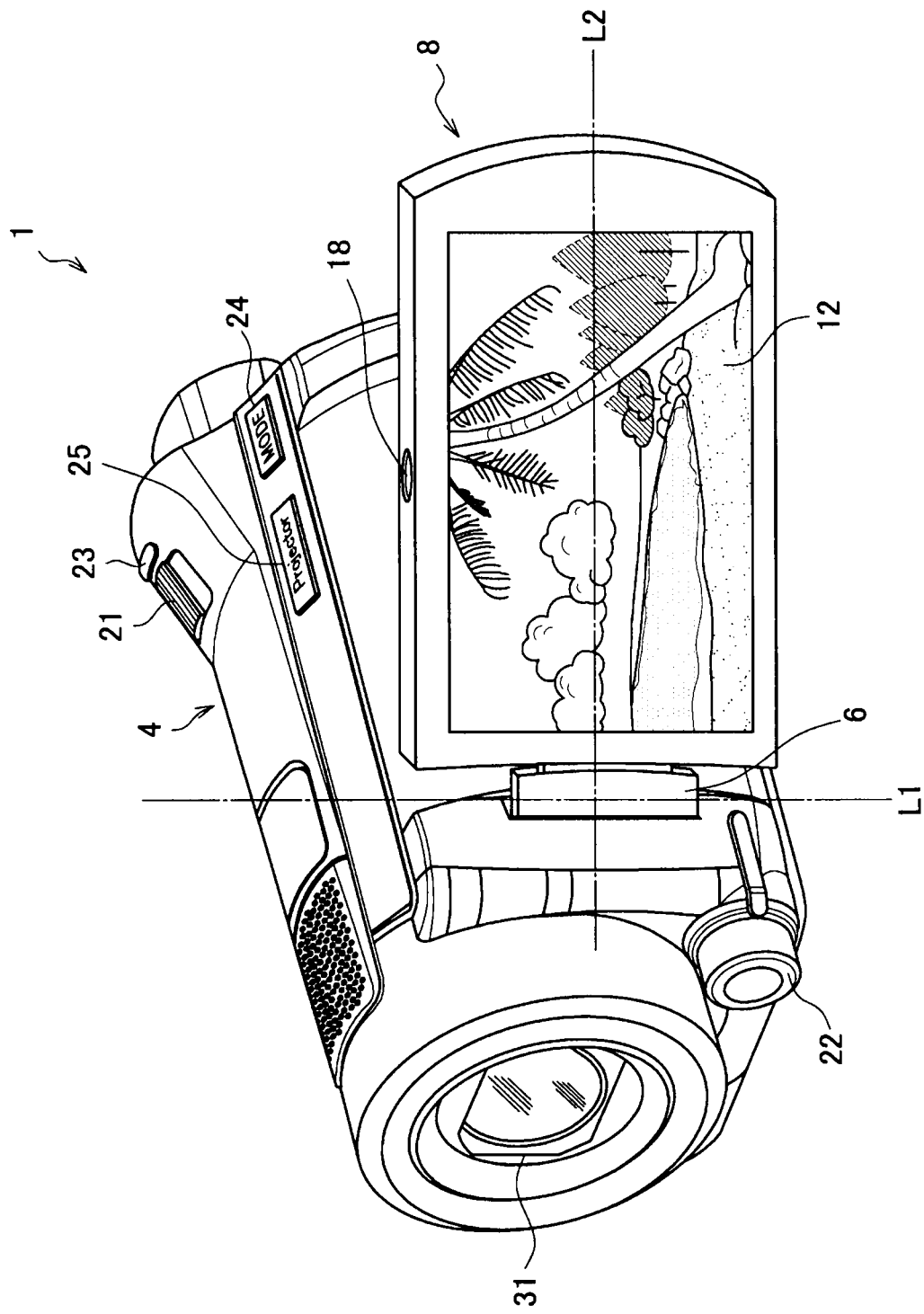
FIG. 2 is a perspective view showing the appearance of an imaging device in accordance with an embodiment of the present disclosure.

FIGS. 1 and 2 are perspective views each showing the appearance of an imaging device 1 in accordance with an embodiment of the present disclosure. As shown in FIG. 1, the imaging device 1 includes a main body unit 4, a hinge mechanism 6, and an open/close unit 8.

The main body unit 4 of the imaging device 1 includes a zoom operation unit 21, a manual operation unit 22, a still image capturing operation unit 23, a mode operation unit 24, a projection switching operation unit 25, and an imaging optical unit 31.

The imaging optical unit 31 is an imaging unit that includes a shooting lens for condensing light emitted from a subject and a zoom lens, and that forms an image of the subject at a signal conversion unit such as a CCD (Charge Coupled Device) or a CMOS (Complementary Metal Oxide Semiconductor). When an image of the subject is formed at the signal conversion unit, the image of the subject is converted into an electrical image signal by the signal conversion unit.

The zoom operation unit 21 receives a user's operation for changing the focal length of the imaging optical unit 31 in the shooting mode. The zoom operation unit 21 includes a lever that can be tiled to a wide position or a telephoto position as shown in FIG. 1, for example. In this case, the imaging optical unit 31 reduces the focal length (shrinks the image of the subject) when the lever is tilted to the wide position, and increases the focal length (enlarges the image of the subject) when the lever is tilted to the telephoto position.

The manual operation unit 22 receives a user's operation for focusing the imaging optical unit 31. The manual operation unit 22 includes a dial that can rotate clockwise or counterclockwise as shown in FIG. 1, for example. In this case, the imaging optical unit 31 adjusts the focal position in accordance with the rotation direction and the rotation amount of the dial.

The still image capturing operation unit 23 receives a user's operation for capturing a still image. The still image capturing operation unit 23 includes a pressing button as shown in FIG. 1, for example. In this case, the imaging device 1 captures a still image in accordance with pressure applied to the button, thereby acquiring image data of the still image.

The mode operation unit 24 receives a user's operation for switching the operation mode of the imaging device 1. Herein, operation modes of the imaging device 1 are broadly divided into a shooting mode and a playback mode, for example. The mode operation unit 24 includes a pressing button as shown in FIG. 1, for example. In this case, the imaging device 1 switches the operation mode between the shooting mode and the playback mode in accordance with pressure applied to the button.

Note that the shooting mode is an operation mode for capturing an image of a subject by operating the imaging optical unit 31, the signal conversion unit, and the like. Meanwhile, the playback mode is an operation mode for playing back the image data acquired in the shooting mode, for example. The details of such operation modes are described below with reference to FIG. 4 to FIG. 6.

The projection switching operation unit 25 receives a user's operation for switching whether or not to project a screen, which has been generated by the imaging device 1, from the projector module 18. For example, the projection switching operation unit 25 includes a pressing button as shown in FIG. 1, for example. In this case, the imaging device 1 switches whether or not to project a screen from the projector module 18 in accordance with pressure applied to the button. Note that while a screen is projected from the projector module 18, the touch panel 12 can display the same screen as the projection screen, display a screen that is different from the projection screen, or display no screen.

Described above is the configuration of the main body unit 4 of the imaging device 1. Next, the configuration of the open/close unit 8 that is connected to the main body unit 4 via the hinge mechanism 6 will be described.

The open/close unit 8 is connected to the main body unit 4 via the hinge mechanism 6 such that it can rotate about a first rotation axis L1 and about a second rotation axis L2, which is perpendicular to the first rotation axis L1, shown in FIG. 2. FIG. 1 shows a state in which the open/close unit 8 is closed with respect to the main body unit 4, while FIG. 2 shows a state in which the open/close unit 8 is rotated about the first rotation axis L1 so that the open/close unit 8 is open with respect to the main body unit 4.

Such an open/close unit 8 has the touch panel 12 on one side and has the projector module 18 on a side surface as shown in FIG. 2. Note that the position at which the projector module is provided is not limited to the side surface of the open/close unit 8 shown in FIG. 2, and can be another side surface of the open/close unit 8, the same surface as the surface on which the touch panel 12 is provided, or a rear surface.

The touch panel 12 is an example of an operation display unit having a display function and an operation detection function. The touch panel 12 can display an image of a subject obtained by focusing light with the imaging optical unit 31 in the shooting mode, and can display an index screen, a playback screen, or the like described below in the playback mode. In addition, the user is able to input various instructions or information to the imaging device 1 by operating the touch panel 12.

The projector module 18 is a projection unit that projects a screen generated by the imaging device 1. The projector module 18 can, in response to a user's operation on the projection switching operation unit 25, project an index screen, a playback screen, or the like described below, for example. Hereinafter, the detailed configuration of the projector module 18 will be described with reference to FIG. 3.

Figure 3:
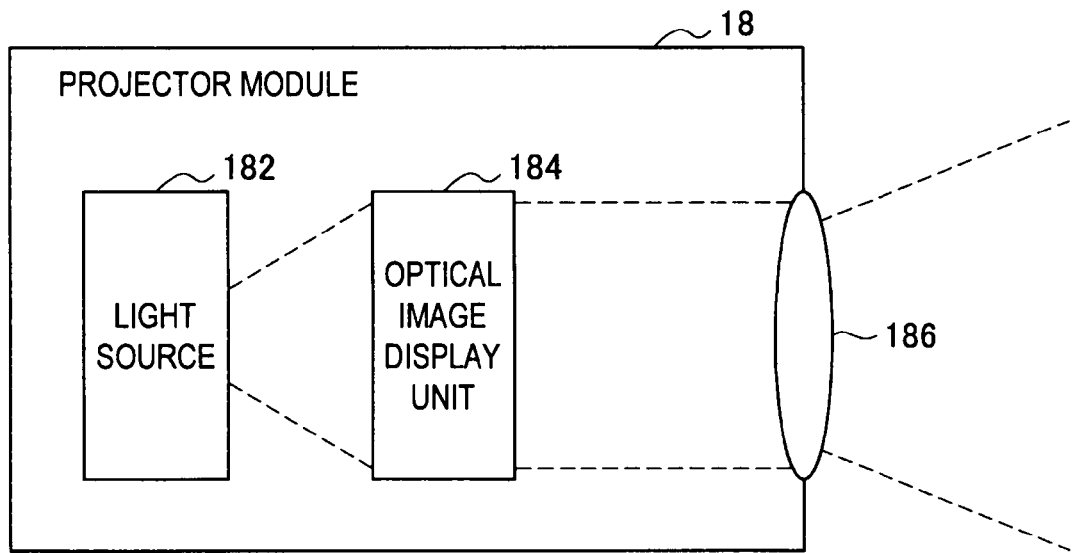
FIG. 3 is an explanatory diagram showing the configuration of a projector module.

FIG. 3 is an explanatory diagram showing the configuration of the projector module 18. As shown in FIG. 3, the projector module 18 includes a light source 182, an optical image display unit 184, and a projection lens 186.

The light source 182 includes white LED (Light Emitting Diode) that emits white light, and an optical unit that diffuses the light emitted from the white LED and shines the light onto the optical image display unit 184. Although this embodiment mainly describes an example in which the light source 182 includes white LED, the configuration of the light source 182 is not limited thereto. For example, the light source 182 can include a high-pressure mercury lamp.

The optical image display unit 184 is a liquid crystal panel that displays a screen for projection. The screen displayed on the optical image display unit 184 is supplied to the projection lens 186 by the light emitted from the light source 182. The projection lens 186 forms an image of the screen, which is displayed on the optical image display unit 184, on the projection screen.

(Shooting Mode and Playback Mode)

Described above is the basic configuration of the imaging device 1 in accordance with an embodiment of the present disclosure. Next, the shooting mode and the playback mode, which are the operation modes of the imaging device 1, will be described.

Figure 4:
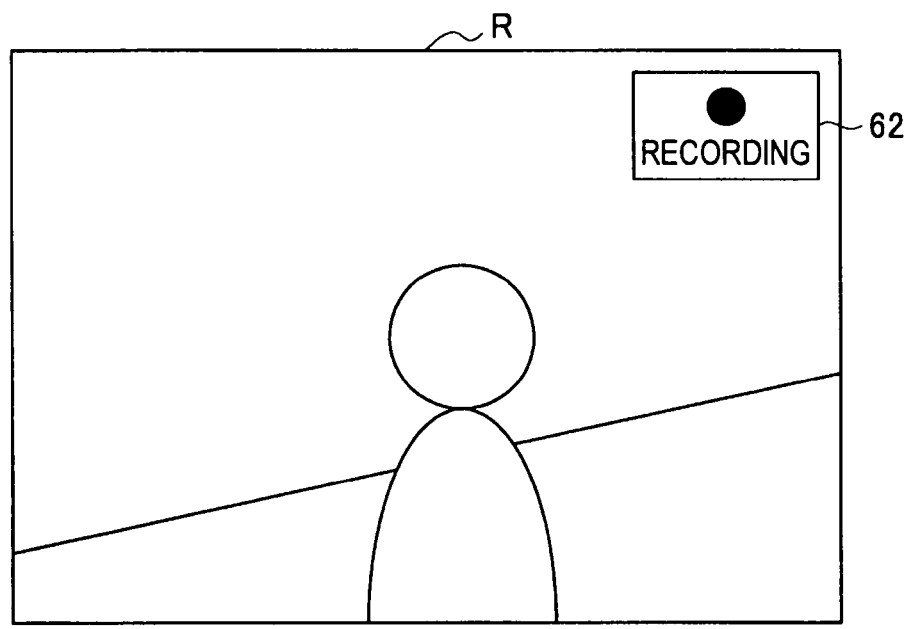
FIG. 4 is an explanatory diagram showing a specific example of an imaging screen.

The shooting mode is an operation mode for capturing an image of a subject by operating the imaging optical unit 31, the signal conversion unit, and the like. In this shooting mode, an imaging screen R of a subject obtained by the imaging optical unit 31 is displayed on the touch panel 12 as shown in FIG. 4. Further, while the imaging screen R is being recorded, a recording mark 62 is added to the imaging screen R as shown in FIG. 4.

Note that when the still image capturing operation unit 23 is pressed by the user in the shooting mode, the imaging device 1 captures a still image of the subject to acquire image data of the still image.

Then, when the mode operation unit 24 is pressed by the user in the shooting mode, the imaging device 1 switches the operation mode to the playback mode. The playback mode is an operation mode for playing back content data. Therefore, after switching the operation mode to the playback mode, the imaging device 1 generates an index screen I for the user to select content data to be played back.

Figure 5:
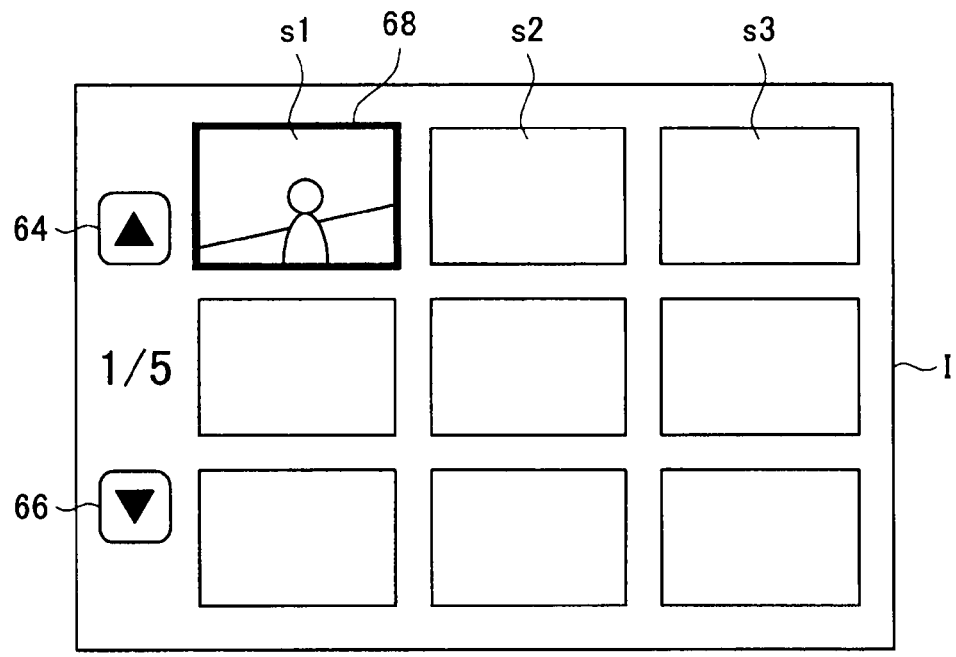
FIG. 5 is an explanatory diagram showing a specific example of an index screen.

FIG. 5 is an explanatory diagram showing a specific example of the index screen I. As shown in FIG. 5, the index screen I includes thumbnails s1, s2, s3, . . . each corresponding of a plurality of pieces of content data. Note that the content data can be image data acquired by the imaging device 1 through imaging or image data acquired from the outside. In addition, the data type of the content data is not limited to image data, and the data type of the content data can be audio data, game, software, or the like. In addition, each thumbnail s can be either a still image or a moving image.

The index screen I includes an upward scroll button 64 and a downward scroll button 66. The user is able to scroll on the index screen I in any direction by selecting the upward scroll button 64 or the downward scroll button 66.

In addition, the user is able to select content data to be played back by placing a cursor 68 over a desired thumbnail on the index screen I. Then, when content data to be selected is determined by the user, the imaging device 1 starts playing back the selected content data and generates a playback screen of the content data.

Figure 6:
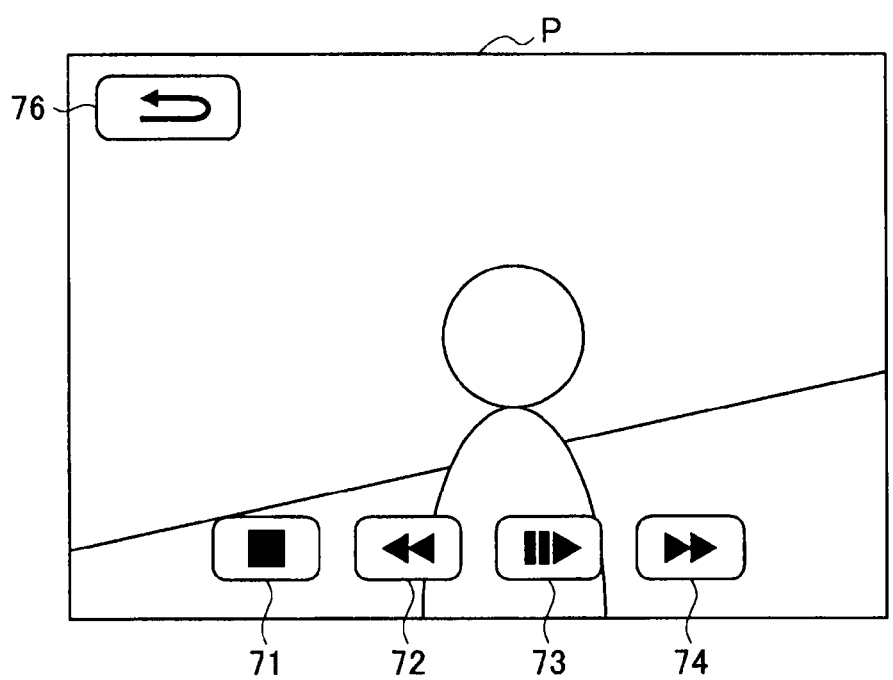
FIG. 6 is an explanatory diagram showing a specific example of a playback screen.

FIG. 6 is an explanatory diagram showing a specific example of the playback screen P of the content data. As shown in FIG. 6, the playback screen P of the content data includes a stop button 71, a fast-rewind button 72, a play/pause button 73, a fast-forward button 74, and a return button 76.

When the stop button 71, the fast-rewind button 72, the play/pause button 73, or the fast-forward button 74 is selected by the user, the imaging device 1 controls playback of the content data in accordance with the selected button. For example, when the stop button 71 is selected by the user, the imaging device 1 stops playback of the content data. In addition, when the return button 76 is selected by the user, the imaging device 1 stops playback of the content data, and generates the index screen I.

Although description has been made above of an example in which switching between the shooting mode and the playback mode is performed in accordance with a user's operation on the mode operation unit 24, the trigger to switch the mode is not limited thereto. For example, a button for switching the operation mode to the playback mode can be added to the imaging screen R so that the imaging device 1 can, when the button for switching the operation mode to the playback mode is selected by the user, switch the operation mode to the playback mode. Likewise, a button for switching the operation mode to the shooting mode can be added to the index screen I or the playback screen P so that the imaging device 1 can, when the button for switching the operation mode to the shooting mode is selected by the user, switch the operation mode to the shooting mode.

The configuration of the index screen I is not limited to the example shown in FIG. 5. For example, the index screen I can be a screen in which a thumbnail of image data is overlaid on a position associated with the image data on a map (e.g., imaging position), or a screen in which a thumbnail of image data is overlaid on a position associated with the image data on the time axis (e.g., imaging date and time).

In addition, the imaging device 1 in the playback mode can display the aforementioned index screen I or playback screen P on the touch panel 12, and can also project such screen from the projector module 18.

<2. First Embodiment>

[2-1. Configuration of Imaging Device]

Figure 7:
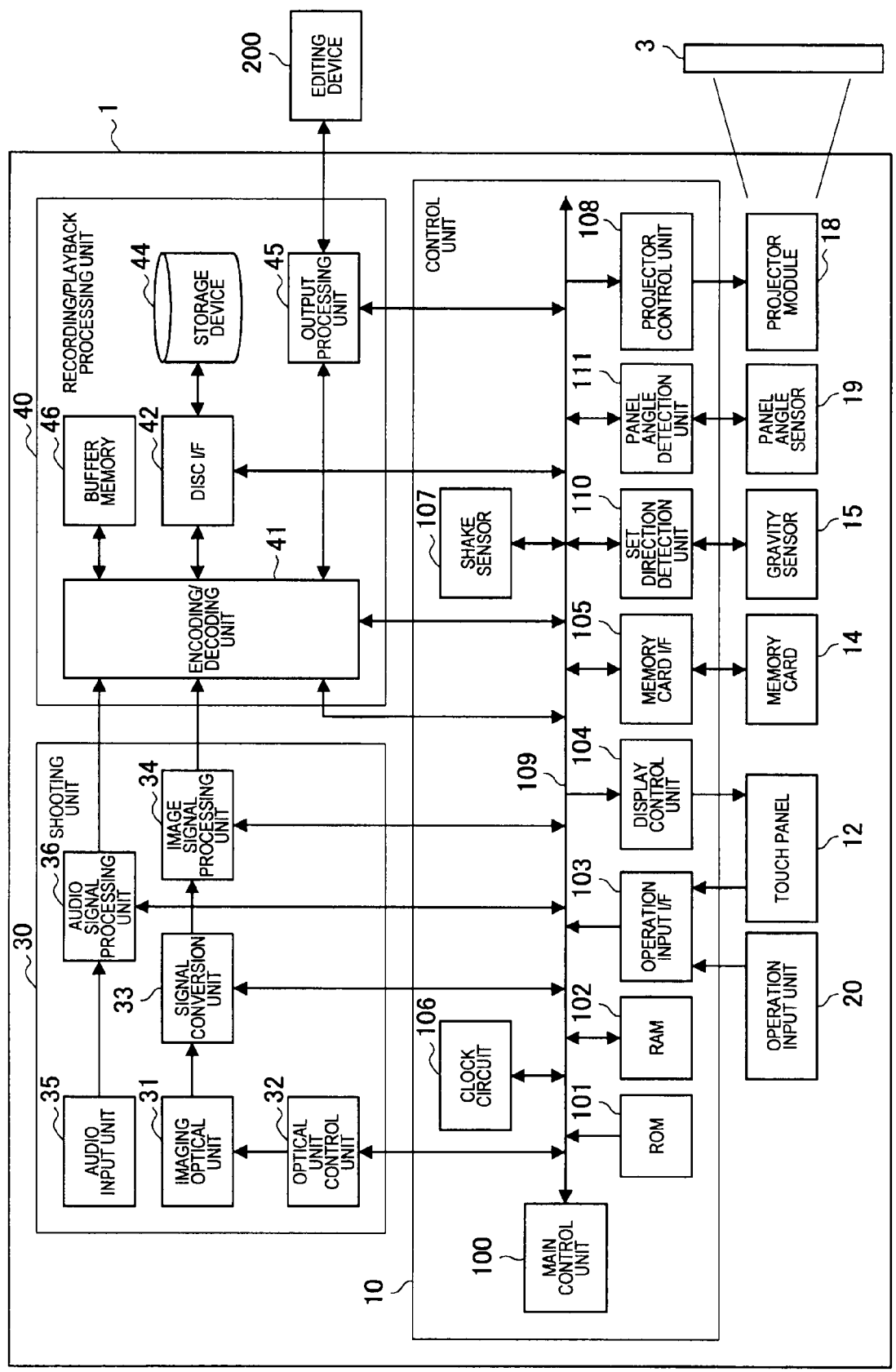
FIG. 7 is a block diagram showing the configuration of an imaging device in accordance with the first embodiment of the present disclosure.

FIG. 7 is a block diagram showing the configuration of the imaging device 1 in accordance with the first embodiment of the present disclosure. As shown in FIG. 7, the imaging device 1 in accordance with the first embodiment of the present disclosure includes a control unit 10, an imaging unit 30, and a recording/playback processing unit 40.

The shooting unit (imaging unit) 30 includes the imaging optical unit 31, an optical unit control unit 32, a signal conversion unit 33, an image signal processing unit 34, an audio input unit 35, and an audio signal processing unit 36.

The imaging optical unit 31 includes a lens group for imaging a subject, a diaphragm adjustment mechanism, a focus adjustment mechanism, a zoom mechanism, a shutter mechanism, a flash mechanism, a shake correction mechanism, and the like, and forms an image of the subject at the signal conversion unit 33.

The optical unit control unit 32, upon receiving a control signal from the control unit 10, generates a control signal to be supplied to the imaging optical unit 31. Then, the optical unit control unit 32 supplies the generated control signal to the imaging optical unit 31 and performs control such as zoom control, shutter control, and exposure control.

The signal conversion unit 33 includes, for example, an image sensor such as a CCD or a CMOS as described above. The signal conversion unit 33, when supplied with an image acquisition timing signal from the control unit 10 on the basis of a user's operation on the operation input unit 20, converts an image of the subject, which has been formed on an imaging plane by the imaging optical unit 31, into an electrical image signal, and supplies it to the image signal processing unit 34. In the shooting mode, image acquisition timing signals are continuously supplied from the control unit 10. Thus, the signal conversion unit 33 acquires image signals of a plurality of frames by continuously converting image signals of the subject.

The image signal processing unit 34, on the basis of a control signal from the control unit 10, performs processes such as gamma correction and AGC (Auto Gain Control) on the image signal, and also performs a process of converting the image signal into a digital format.

The audio input unit 35 collects sound around the subject in the shooting mode. The audio input unit 35 converts the collected sound into an electrical audio signal, and supplies it to the audio signal processing unit 36. The audio signal processing unit 36, on the basis of a control signal from the control unit 10, performs processes such as correction or AGC on the audio signal, and also performs a process of converting the audio signal into a digital format.

The recording/playback processing unit 40 includes an encoding/decoding unit 41, a disc interface 42, a storage device 44, an output processing unit 45, and buffer memory 46 as shown in FIG. 7, and functions as a playback unit and a recording unit.

The encoding/decoding unit 41 has an encoding function in which an image signal and an audio signal supplied from the shooting unit 30 and additional recording information such as time information are encoded and multiplexed using a MPEG scheme or the like, and then converted into compressed data including image data and audio data.

Meanwhile, the encoding/decoding unit 41 also has a decoding function (a playback function) in which image data and audio data are separated from the compressed data, and then the image data and the audio data are decoded into an image signal and an audio signal (a playback processing unit).

In addition, the encoding/decoding unit 41 further performs, on the basis of a control signal from the control unit 10, automatic white balance control, exposure correction control, magnification control in accordance with digital zoom magnification, and the like on the image signal supplied from the image signal processing unit 34.

The disc interface 42 writes the compressed data supplied from the encoding/decoding unit 41 into the storage device 44. In addition, the disc interface 42 reads the compressed data from the storage device 44 and supplies it to the encoding/decoding unit 41. Note that the storage device 44 can be an optical disc such as DVD-R (Digital Versatile Disc Recordable) or BD (Blu-Ray Disc®).

The output processing unit 45 is controlled by the main control unit 100 via a system bus 109. The output processing unit 45 supplies the compressed data supplied from the encoding/decoding unit 41 to the control unit 10 and an editing device 200. Herein, the editing device 200 can be, for example, an information processing device connected to the imaging device 1 via an output terminal of the output processing unit 45. The user is able to edit image data, audio data, or the like using the editing device 200.

The buffer memory 46 includes, for example, SDRAM and is used as a work area for performing encoding or decoding with the encoding/decoding unit 41.

The control unit 10 is configured such that, as shown in FIG. 7, the main control unit 100, ROM (Read Only Memory) 101, RAM (Random Access Memory) 102, an operation input interface 103 that receives an operation input from the operation input unit 20 or from the touch panel 12, a display control unit 104 that controls the touch panel 12, a memory card interface 105 to be loaded with a memory card 14, a clock circuit 106 that generates time information for use in the recording of the shooting time or the like, and a projector control unit 108 that controls the projector module 18 are connected via the system bus 109.

The main control unit 100 manages the processing of the entire imaging device 1, and uses the RAM 102 as a work area. In addition, the main control unit 100 performs control in accordance with an operation mode specified through a user's operation on the mode operation unit 24.

For example, when the operation mode is the shooting mode, the main control unit 100 stops power supply to the projector control unit 108 and the projector module 18, and causes the touch panel 12 to display an image signal supplied from the image signal processing unit 34 via the display control unit 104.

Meanwhile, when the operation mode is the playback mode, the main control unit 100 stops power supply to the shooting unit 30, and generates the playback screen P or the index screen I on the basis of a playback signal or thumbnails of image data supplied from the encoding/decoding unit 41, and further causes the touch panel 12 to display the playback screen P or the index screen I via the display control unit 104.

In the ROM 101, a program for controlling the shooting unit 30 and a program for executing recording control, playback control, and the like on image signals and audio signals are written.

The operation input interface 103 transmits operation signals from the connected operation input unit 20 and touch panel 12 to the main control unit 100. Note that the zoom operation unit 21, the manual operation unit 22, the still image capturing operation unit 23, the mode operation unit 24, the projection switching operation unit 25, and the like are collectively referred to as the operation input unit 20.

The display control unit 104 performs control for displaying on the touch panel 12 the image signal supplied from the image signal processing unit 34, the playback screen P or the index screen I generated by the main control unit 100, and the like.

The memory card interface 105 writes the compressed data supplied from the encoding/decoding unit 41 to the memory card 14. In addition, the memory card interface 105 reads the compressed data from the memory card 14 and supplies it to the encoding/decoding unit 41.

The clock circuit 106 generates time information representing the year, month, date, time, hour, minute, second, and the like.

A shake sensor 107 detects shake of the main body unit 4. For example, when the operation mode is the shooting mode, the main control unit 100 sends a detection result obtained by the shake sensor 107 to the optical unit control unit 32. Next, the optical unit control unit 32 corrects the shake by bending the optical axis by shifting shift lenses, which are included in the lens group forming the imaging optical unit 31, vertically and horizontally in accordance with the detection result (optical shake correction). When the operation mode is the playback mode and when shake of the main body unit 4 is not detected by the shake sensor 107, the main control unit 100 determines that the main body unit 4 is still, that is, in a state of being placed.

The projector control unit 108 performs control for projecting a screen onto a projection screen 3 from the projector module 18. On the basis of the control of the projector control unit 108, the playback screen P or the index screen I, for example, is projected onto the projection screen 3 from the projector module 18. In particular, the projector control unit 108 in accordance with this embodiment controls the start of projection in accordance with the direction that the main body unit 4 faces and the projection direction of the projector module. The details of the projection start control will be described in "2-2. Operation of Imaging Device" with reference to FIGS. 8 and 9.

A set direction detection unit 110 detects the direction that the main body unit 4 faces on the basis of a detection result obtained by a gravity sensor 15. Information indicating the direction that the main body unit 4 faces, which has been detected by the set direction detection unit 110, is used for the projection start control described below.

A panel angle detection unit 111 detects the open/close angle of the open/close unit 8 around the axis L1 and the open/close angle of the open/close unit 8 around the axis L2 on the basis of a detection result obtained by a panel angle sensor 19. The main control unit 100, on the basis of the open/closed state of the open/close unit 8 detected by the panel angle detection unit 111 and the direction that the touch panel 12 faces, determines the projection direction of the projector module 18 provided on the open/close unit 8. Information indicating the projection direction is used for the projection start control described below.

[2-2. Operation of Imaging Device]

Figure 8:
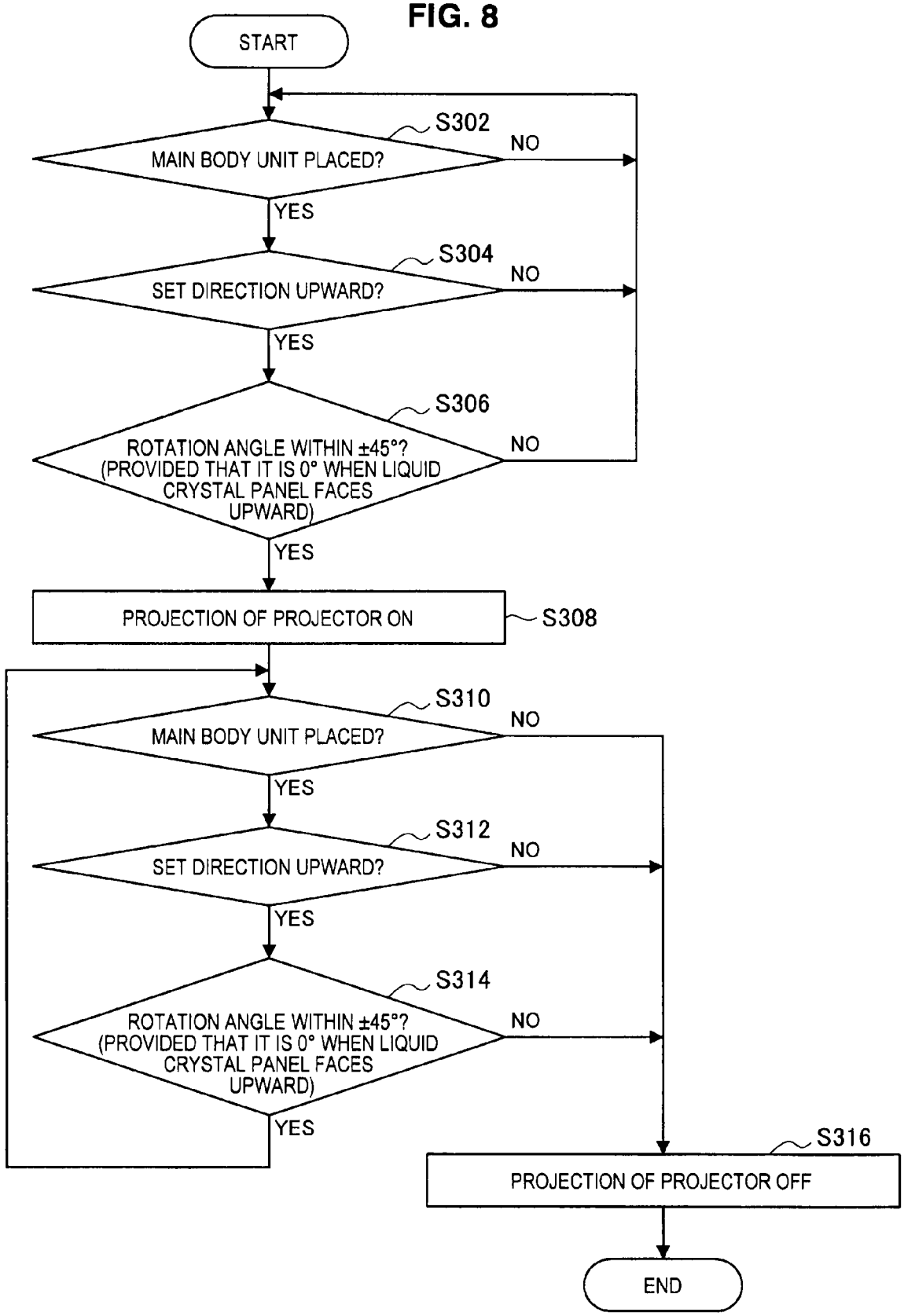
FIG. 8 is a flowchart showing the operation process of the imaging device in accordance with the first embodiment of the present disclosure.
Figure 9:
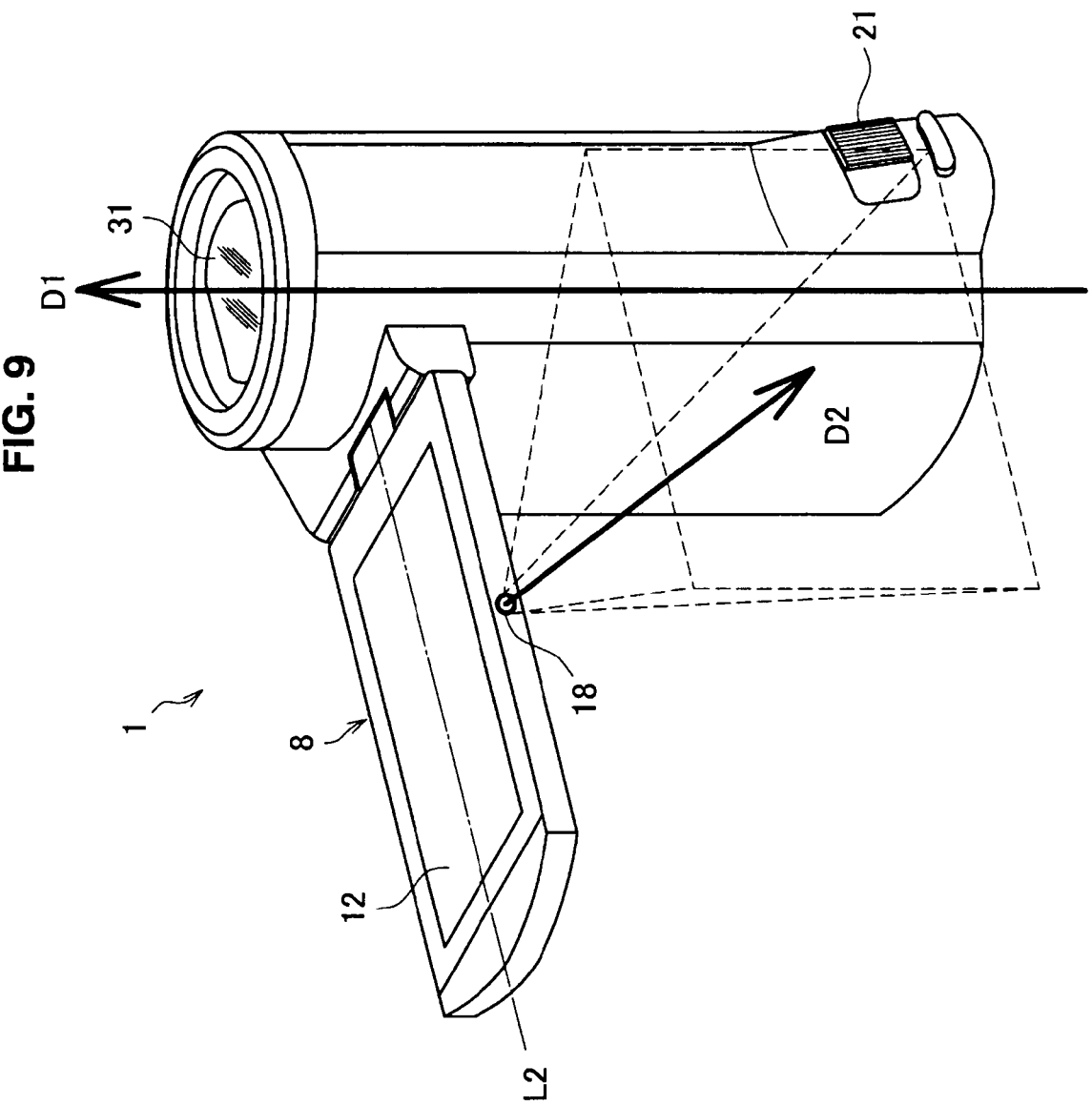
FIG. 9 is a perspective view showing the posture of the imaging device during projection in accordance with the first embodiment of the present disclosure.

Next, the operation of the imaging device 1 in accordance with this embodiment will be descried with reference to FIGS. 8 and 9. FIG. 8 is a flowchart showing the operation process of the imaging device 1 in accordance with this embodiment. FIG. 9 is a perspective view showing the posture of the imaging device 1 during projection in accordance with this embodiment.

As shown in FIG. 8, the main control unit 100 starts projection of a screen from the projector module 18 via the projector control unit 108 when the shake sensor 107 has not detected shake of the main body unit 4 and thus has determined that the imaging device 1 is in a state of being placed (step S302/Yes), the set direction detection unit 110 has detected that the imaging optical unit 31 of the main body unit 4 faces upward and is placed in the vertical direction in which the imaging optical axis direction D1 is vertical as shown in FIG. 9 (step S304/Yes), and the panel angle detection unit 111 has detected that, provided that the rotation angle of the touch panel 12 provided on the open/close unit 8 about the rotation axis L2 when the touch panel 12 faces upward and is placed horizontally is zero degree, the rotation angle is within ±45° (step S306/Yes).

Herein, the projection start conditions shown in steps S302 to S306 above will be described. First, when projection with a projector is performed, it is assumed that a user places the imaging device 1 on a table or the like. Thus, if the main body unit 4 has been placed is detected in step S302.

Next, the imaging device 1 is usually used while the imaging optical axis direction D1 of the main body unit 4 is placed in the horizontal direction. Thus, in this embodiment, a case in which the imaging device 1 is used while the imaging optical axis direction D1 of the main body unit 4 is placed in the vertical direction as shown in FIG. 9 is used as a special trigger to control the start of projection. Thus, the condition of step S304 is provided.

Further, as projection from a projector is usually performed toward a vertical plane such as a wall or a screen, it is desired that the projection start control be performed when the projection direction is approximately horizontal. In addition, it is also desired that a user be able to select a projection screen, for example, by operating the touch panel 12 during the projection. Thus, it is desired that the projector module 18 provided on the open/close unit 8 be provided at a position where the projection direction D2 is horizontal as shown in FIG. 9 when the main body unit 4 is placed such that the imaging optical unit 31 faces upward and is placed in the vertical direction in which the imaging optical axis direction D1 is vertical, and the open/close unit 8 is in a state of being open with respect to the main body unit 4 with the touch panel 12 facing outward (the touch panel 12 facing upward).

Although the touch panel 12 shown in FIG. 9 is placed horizontally, there may be cases in which a user would be able to operate the touch panel 12 more easily if it is tilted a little. Thus, projection is desirably performed even when, provided that the rotation angle of the touch panel 12 about the rotation axis L2 when the touch panel 12 faces upward and is placed horizontally as shown in FIG. 9 is zero degree, the rotation angle is within ±45°. Thus, the condition of step S306 is provided.

After projection is started in accordance with the conditions shown in steps S302 to S306 described above, when the shake sensor 107 has detected shake of the main body unit 4 and thus has determined that the imaging device 1 is in a state of being lifted (step S310/No), when the set direction detection unit 110 has detected a set direction of the imaging optical axis direction D1 of the main body unit 4 other than the vertical, upward direction (S312/No), and when the panel angle detection unit 111 has detected that the touch panel 12 provided on the open/close unit 8 does not face upward and the rotation angle is not within ±45° (step S314/No), the main control unit 100 terminates the projection of a screen from the projector module 18 via the projector control unit 108.

Herein, even when the open/close unit 8 is more or less rotated while the touch panel 12 is operated, the projection is desirably continued. Thus, in step S314 described above, the projection is not terminated as long as, provided that the rotation angle of the touch panel 12 about the rotation axis L2 when the touch panel 12 faces upward and is placed horizontally as shown in FIG. 9 is zero degree, the rotation angle is within ±45° (step S314/Yes).

(Operation During Projection)

Next, an operation unit when the imaging device 1 in accordance with this embodiment is projecting a screen will be described. In addition to an operation input received by the aforementioned touch panel 12, a user's operation different from that in the shooting mode can also be received by the operation input unit 20. For example, the zoom operation unit 21 shown in FIG. 9 includes a lever that can be tiled to a wide position or a telephoto position, for example, as described above, and can receive a user's operation for enlarging or shrinking an image in the shooting mode. However, in the playback mode, when the index screen I shown in FIG. 5 is projected, for example, it is also possible to select a thumbnail by moving the cursor 68 to a side to which the lever is tilted.

Further, the imaging device 1 in accordance with this embodiment can receive a user's operation from an image captured by the imaging optical unit 31 of the imaging unit 30 in the playback mode. In this case, unlike in the shooting mode, the image captured by the imaging optical unit 31 is not recorded on the storage device 44 or displayed on the touch panel 12.

Figure 10:
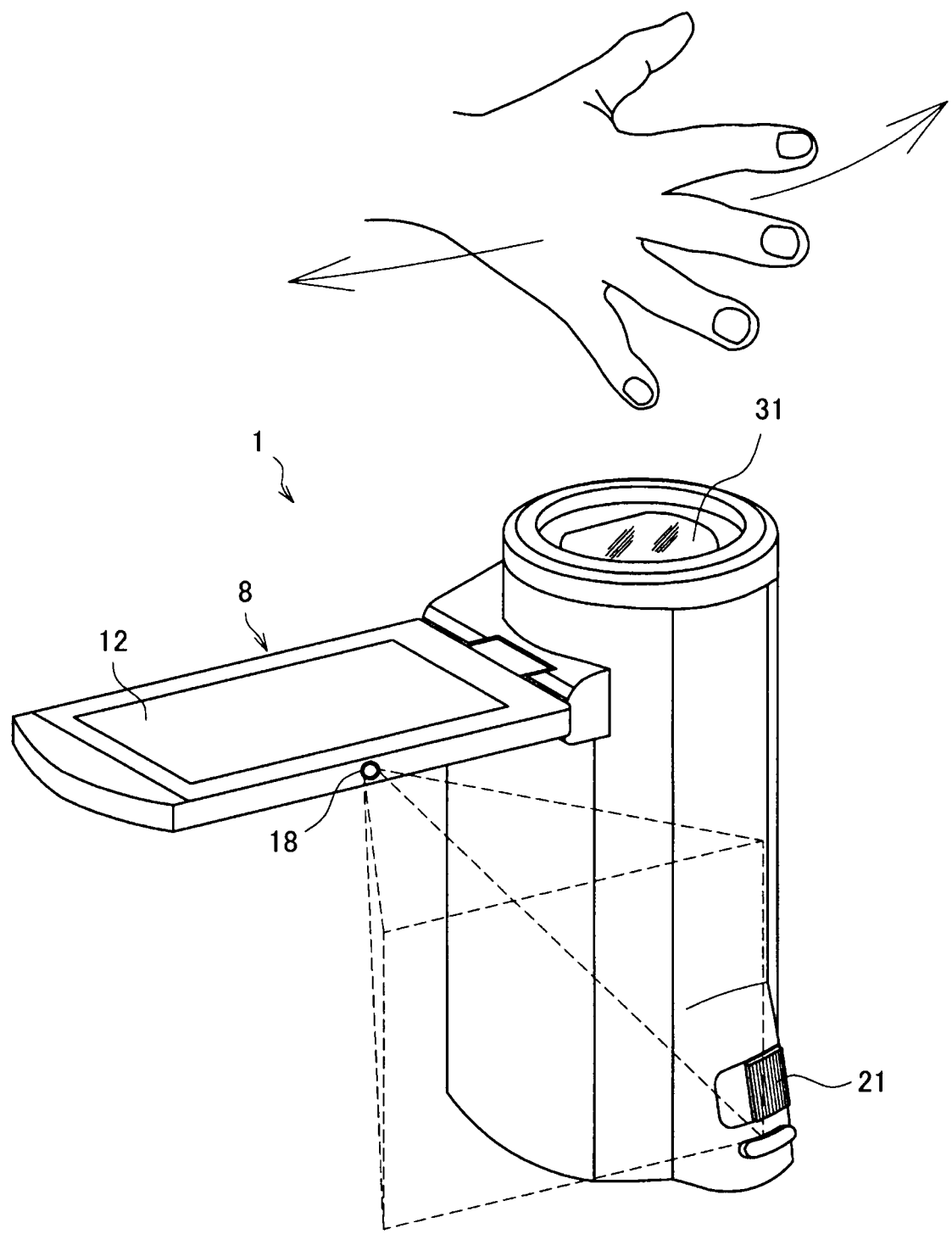
FIG. 10 is a perspective view illustrating the operation of the imaging device during projection in accordance with the first embodiment of the present disclosure.

For example, when the imaging optical unit 31 has imaged a hand movement of a user as shown in FIG. 10 while the index screen I shown in FIG. 5 is projected, it is possible to select a thumbnail by moving the cursor 68 in the direction of the hand movement. Using the imaging optical unit 31 in this manner allows a gesture input.

In addition, when the imaging optical unit 31 has imaged a face of a user, the main control unit 100 can recognize the face and calculate the feature of the face, and then extract an image containing a face with the same feature from the storage device 44 and display the image as a thumbnail.

<3. SECOND EMBODIMENT>

Figure 11:
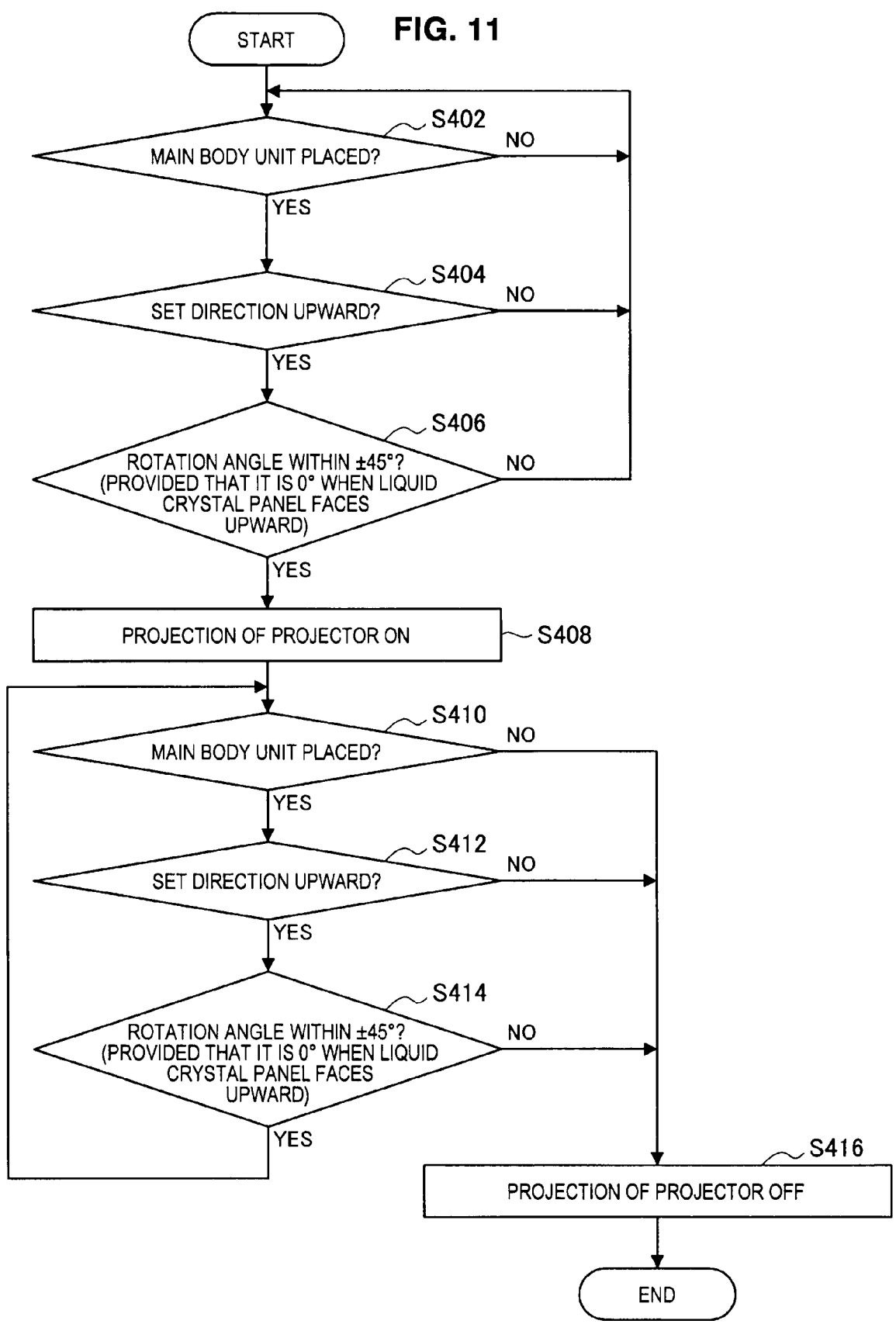
FIG. 11 is a flowchart showing the operation process of an imaging device in accordance with the second embodiment of the present disclosure.
Figure 12:
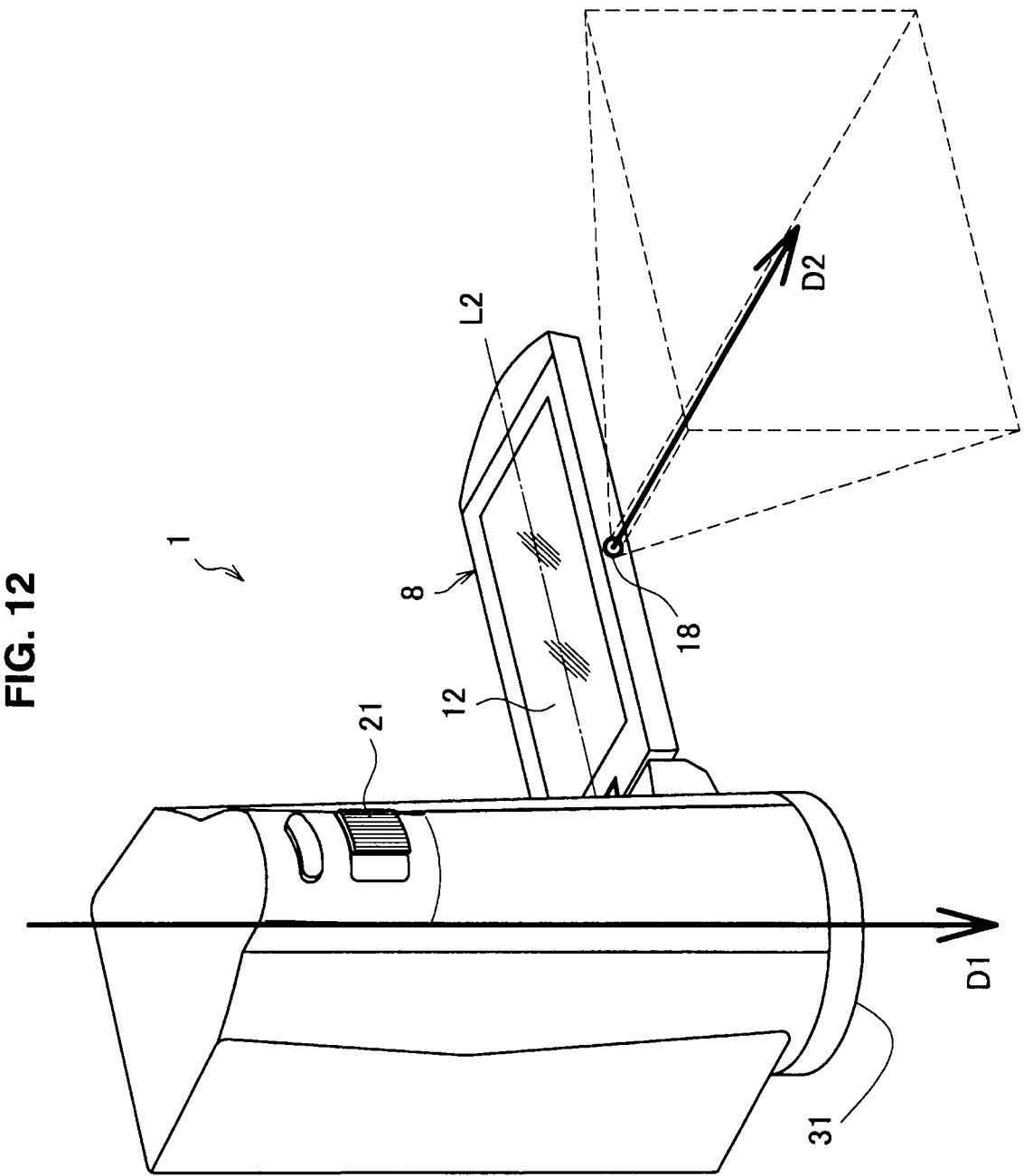
FIG. 12 is a perspective view showing the posture of the imaging device during projection in accordance with the second embodiment of the present disclosure.

Next, the imaging device 1 in accordance with the second embodiment of the present disclosure will be described with reference to FIGS. 11 and 12. FIG. 11 is a flowchart showing the operation process of the imaging device 1 in accordance with this embodiment. FIG. 12 is a perspective view showing the posture of the imaging device 1 during projection in accordance with this embodiment.

As shown in FIG. 11, the main control unit 100 starts projection of a screen from the projector module 18 via the projector control unit 108 when the shake sensor 107 has not detected shake of the main body unit 4 and thus has determined that the imaging device 1 is in a state of being placed (step S402/Yes), the set direction detection unit 110 has detected that the imaging optical unit 31 of the main body unit 4 faces downward and is placed in the vertical direction in which the imaging optical axis direction D1 is vertical as shown in FIG. 12 (step S404/Yes), and the panel angle detection unit 111 has detected that, provided that the rotation angle of the touch panel 12 provided on the open/close unit 8 about the rotation axis L2 when the touch panel 12 faces upward and is placed horizontally is zero degree, the rotation angle is within ±45° (step S406/Yes).

Herein, the projection start conditions shown in steps S402 to S406 above will be described. First, the description of step S402 will be omitted as it is similar to step S302 described in the aforementioned [2-2. Operation of Imaging Device].

Next, the condition of step S404 will be described. The imaging device 1 is usually used while the imaging optical axis direction D1 of the main body unit 4 is placed in the horizontal direction. Thus, a case in which the imaging device 1 is used while the imaging optical axis direction D1 of the main body unit 4 is placed in the vertical direction as shown in FIG. 12 is used as a special trigger to control the start of projection. In addition, unlike in the aforementioned first embodiment, the imaging device 1 in accordance with this embodiment is set such that the imaging optical unit 31 of the main body unit 4 faces downward and is placed in the vertical direction in which the imaging optical axis direction D1 is vertical.

Further, as projection from a projector is usually performed toward a vertical plane such as a wall or a screen as described above, it is desired that the projection start control be performed when the projection direction is approximately horizontal. In addition, it is also desired that a user be able to select a projection screen, for example, by operating the touch panel 12 during the projection. Thus, it is desired that the projector module 18 provided on the open/close unit 8 be provided at a position where the projection direction D2 is horizontal as shown in FIG. 12 when the main body unit 4 is placed such that the imaging optical unit 31 faces downward and is placed in the vertical direction in which the imaging optical axis direction D1 is vertical, and the open/close unit 8 is in a state of being open with respect to the main body unit 4 with the touch panel 12 facing inward (the touch panel 12 facing upward).

Although the touch panel 12 shown in FIG. 12 is placed horizontally, there may be cases in which a user would be able to operate the touch panel 12 more easily if it is tilted a little. Thus, projection is desirably performed even when, provided that the rotation angle of the touch panel 12 about the rotation axis L2 when the touch panel 12 faces upward and is placed horizontally as shown in FIG. 12 is zero degree, the rotation angle is within ±45°. Thus, the condition of step S406 is provided.

After projection is started in accordance with the conditions shown in steps S402 to S406 described above, when the shake sensor 107 has detected shake of the main body unit 4 and thus has determined that the imaging device 1 is in a state of being lifted (step S410/No), when the set direction detection unit 110 has detected a set direction of the imaging optical axis direction D1 of the main body unit 4 other than the vertical, downward direction (S412/No), and when the panel angle detection unit 111 has detected that the touch panel 12 provided on the open/close unit 8 does not face upward and the rotation angle is not within ±45° (step S414/No), the main control unit 100 terminates the projection of a screen from the projector module 18 via the projector control unit 108.

Herein, even when the open/close unit 8 is more or less rotated while the touch panel 12 is operated, the projection is desirably continued. Thus, in step S414 described above, the projection is not terminated as long as, provided that the rotation angle of the touch panel 12 about the rotation axis L2 when the touch panel 12 faces upward and is placed horizontally as shown in FIG. 12 is zero degree, the rotation angle is within ±45° (step S414/Yes).

<4. Conclusion>

As described above, the imaging device 1 in accordance with the embodiments of the present disclosure automatically projects a screen in accordance with the direction that the main body unit 4 faces and the projection direction of the projector module 18. Thus, it is possible to reduce the burden of the complex operation for starting projection for the user, and to simplify the operation for starting the projection.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the steps in the process of the imaging device 1 in this specification need not necessarily be processed in a time-series order in accordance with the order described in the flowchart. For example, steps S302, S304, and S306 in the process of the imaging device 1 shown in FIG. 8 can be performed in an order different from that described in the flowchart, or be processed in parallel.

It is also possible to create a computer program for causing built-in hardware in the imaging device 1 to exert a function that is equivalent to each configuration of the aforementioned imaging device 1. In addition, a storage medium having the computer program stored therein is also provided.

What is claimed is:

1. An information processing apparatus comprising:
   a main body;
   a member including a projection device, the member attached to the main body and movable in at least first and second axial directions with respect to the main body; and
   circuitry configured to detect an orientation of the movable member with respect to the main body; detect whether the main body faces a first direction or a second direction; detect whether the information processing apparatus is stationary; and control the projection device to be turned on when it is detected indicates that the information processing apparatus faces the first direction, the information processing apparatus is stationary, a first surface of the member faces a direction substantially similar to the first direction and an angular orientation of the member around an axis perpendicular to the first direction with respect to the main body is within +/−45 degrees.

2. The information processing apparatus of claim 1, wherein the information processing apparatus is one of a digital video camera, a personal computer, a home game machine, a portable phone, a portable music playback device, a portable image processing device or a portable game machine.

3. The information processing apparatus of claim 1, wherein the circuitry includes a gravity sensor configured to detect a direction that the main body faces.

4. The information processing apparatus of claim 1, wherein the member includes a touch-panel interface on the first surface of the member.

5. The information processing apparatus of claim 4, wherein the projection device is located on a side surface of the member that is substantially perpendicular to the first surface, on the first surface of the member or a second surface of the member that opposes the first surface.

6. The information processing apparatus of claim 1, wherein the circuitry is configured to detect an angular orientation of the member with respect to the main body.

7. The information processing apparatus of claim 1, wherein the circuitry is configured to detect a first angle of the member with respect to the main body in the first axial direction, and a second angle of the member with respect to the main body in the second axial direction.

8. The information processing apparatus of claim 1, wherein the circuitry is configured to detect whether the main body faces the first direction in which an optical unit of the information processing apparatus faces upward or whether the main body faces the second direction in which the optical unit of the information processing apparatus faces downward.

9. The information processing apparatus of claim 8, wherein the member includes a touch-panel interface on the first surface of the member.

10. The information processing apparatus of claim 9, wherein the circuitry is configured to detect a first angle of the member with respect to the main body in the first axial direction, and a second angle of the member with respect to the main body in the second axial direction.

11. The information processing apparatus of claim 1, wherein the circuitry is configured to control the projection device to be turned off when it is detected that the information processing apparatus does not face the first direction, the information processing apparatus is not stationary, the first surface of the member does not face a direction substantially similar to the first direction, or an angular orientation of the member around an axis perpendicular to the first direction with respect to the main body is not within +/−45 degrees.

12. The information processing apparatus of claim 1, further comprising:
an imaging device configured to capture an image corresponding to a user's gesture, wherein
the circuitry is configured to control an operation of the information processing apparatus based on the captured gesture.

13. The information processing apparatus of claim 1, further comprising:
an imaging device configured to capture an image corresponding to a person's face, wherein
the circuitry is configured to recognize features of the person's face and retrieve a stored image corresponding to the recognized features.

14. An information processing apparatus comprising:
a main body;
a member including a projection device, the member attached to the main body and movable in at least first and second axial directions with respect to the main body; and
circuitry configured to detect an orientation of the movable member with respect to the main body; detect whether the main body faces a first direction or a second direction; detect whether the information processing apparatus is stationary; and control the projection device to be turned on when it is detected that the information processing apparatus faces the second direction, the information processing apparatus is stationary, a first surface of the member faces a direction substantially similar to the second direction, and an angular orientation of the member around an axis perpendicular to the first direction with respect to the main body is within +/−45 degrees.

15. The information processing apparatus of claim 14, wherein the circuitry is configured to control the projection device to be turned off when it is detected that the information processing apparatus does not face the second direction, an the information processing apparatus is not stationary, the first surface of the member does not face a direction substantially similar to the second direction, or an angular orientation of the member around an axis perpendicular to the first direction with respect to the main body is not within +/−45 degrees.

16. An information processing method performed by an information processing apparatus, the information processing method comprising:
detecting, by circuitry of the information processing apparatus, an orientation of a movable member movably attached to a main body of the information processing apparatus with respect to the main body and movable in at least first and second axial directions with respect to the main body;
detecting, by the circuitry, whether the main body faces a first direction or a second direction;
detecting, by the circuitry, whether the information processing apparatus is stationary; and
controlling, by the circuitry, a projection device included on the movable member to be turned on when it is detected that the information processing apparatus faces the second direction, the information processing apparatus is stationary, a first surface of the member faces a direction substantially similar to the second direction, and an angular orientation of the member around an axis perpendicular to the first direction with respect to the main body is within +/−45 degrees.

* * * * *